United States Patent [19]

McGregor

[11] 4,024,887
[45] May 24, 1977

[54] AUTOMATIC VALVING SYSTEM

[75] Inventor: Ronald W. McGregor, Arlington, Tex.

[73] Assignee: Vought Corporation, Dallas, Tex.

[22] Filed: Nov. 24, 1975

[21] Appl. No.: 634,980

[52] U.S. Cl. ............................... 137/386; 137/842
[51] Int. Cl.² .......................................... F15C 1/14
[58] Field of Search .......... 137/209, 386, 389, 390, 137/393, 842; 73/290, 548

[56] References Cited

UNITED STATES PATENTS

| | | | |
|---|---|---|---|
| 2,408,603 | 10/1946 | Broithwaite et al. | 137/842 |
| 3,267,949 | 8/1966 | Adams | 137/393 |
| 3,269,404 | 8/1966 | Lebow | 137/386 |
| 3,277,914 | 10/1966 | Marion | 137/393 |
| 3,335,746 | 8/1967 | Lebow | 137/389 |
| 3,415,268 | 12/1968 | Tweed | 137/209 |
| 3,469,593 | 9/1969 | O'Keefe | 137/842 |
| 3,561,465 | 2/1971 | deGraaf | 137/386 |
| 3,703,907 | 11/1972 | Richards | 137/386 |
| 3,712,136 | 1/1973 | Morsen | 73/290 R |

*Primary Examiner*—Martin P. Schwadron
*Assistant Examiner*—G. L. Walton
*Attorney, Agent, or Firm*—James M. Cate; H. C. Goldwire

[57] ABSTRACT

Disclosed is an automatic valving system for shutting off liquid flow into a container when the level of liquid within the container is above a predetermined level, and for permitting liquid flow when the liquid is below the predetermined level. A liquid is positioned within the container at the predetermined level, and a pressure responsive shutoff valve is fluidly connected in series between a source of liquid under pressure and the interior of the container. The shutoff valve has communication with the fluid sensor and is operative to shut off liquid flow into the container in response to a pressure variation received from the sensor upon the level of liquid within the container rising above the predetermined level.

7 Claims, 7 Drawing Figures

AUTOMATIC VALVING SYSTEM

This invention relates to a valving system and, more particularly, to a valving system for shutting off liquid flow to a tank through an inlet upon level of liquid within the tank rising above a predetermined level.

Shutoff valves for preventing the overfilling of containers of liquid are employed in a variety of applications and environments. Such valves often employ a float element which is positioned within a tank at the level above which the liquid is not desired to rise, the float element being vertically movable and operably connected to a movable valving element within a valve, the valve being fluidly connected between the interior of the tank and a source of the liquid with which the tank is to be supplied. The valve is operable to shut off the inflowing liquid in response to upward movement of the float to the desired level, as the liquid rises during filling of the tank. While such mechanical, float actuated valving systems are useful for a number of applications, they often do not have the reliability required for aerospace or other critical applications.

It has thus been sought to improve the reliability of such systems by eliminating the float element and instead relying upon various types of fluidic circuits which respond to the presence of a liquid at a predetermined level within a tank. Such systems may employ a fluid sensor, including first and second, mutually opposed, fluid nozzles positioned within the tank adjacent the predetermined level. Means are provided for ejecting a fluid through the first nozzle toward the second nozzle, whereby a jet of the fluid is caused to impinge against the second nozzle for inducing a pressure head within the orifice of the second nozzle so long as the jet of fluid is permitted to continue. A pressure responsive shutoff valve is connected in series between the interior of the tank and a source of liquid under pressure, and a conduit is connected between the shutoff valve and the second nozzle, whereby the pressure head received from the impinging jet of fluid is transmitted to the shutoff valve, causing it to remain open so long as the fluid jet is received by the second nozzle. Upon the liquid rising within the tank to a level above the first and/or the second nozzle, the jet of fluid is dissipated within the liquid and prevented from reaching the second nozzle, whereupon the pressure head within the second nozzle is substantially reduced, permitting the valve to close and thus preventing further passage of the liquid into the tank. It will be understood by those in the art that such shutoff valves are of the "normally closed" type wherein a biasing means or its equivalent maintains the valve in its closed condition unless a given pressure head is received from the second nozzle. This ensures that the inflowing liquid will be shut off even in the event of a malfunction of the fluid sensor, e.g., in the event one of the nozzles becomes obstructed with foreign material, and the systems using such valves may thus be termed, "fail closed" systems. This propensity to shut off the flow in the event of a malfunction can be a disadvantage in some applications, however, and can be hazardous for certain in-flight uses. For example, when the valving system is used to shut off the flow of fuel from an airborne tanker to another aircraft during in-flight refueling, a "fail closed" valving system could become closed because of a fluid obstruction or a malfunction and thus, undesirably prevent the flow of necessary fuel to the aircraft, endangering the pilot or crew and resulting in a possible loss of the aircraft. If the valve is of a type maintained in an open mode upon liquid under pressure being received at its inlet, however, fuel will be permitted to flow even though the system is partially inoperative, as will be more fully explained hereinbelow with respect to the system of the present invention. Such a system is thus termed a "fail open" valving system. A further disadvantage of some prior systems is their dependence upon an independent source of gas or liquid under pressure to actuate the shutoff valve. This additional pressure system may be a source of possible malfunctions and involves a valving and actuating mechanism which is considerably more complex than that of systems constructed according to the present invention. If the valve were instead actuated by electromechanical servomechanisms, problems of reliability, maintenance, and increased complexity and cost would be entailed.

It is, accordingly, a major object of the present invention to provide a new and improved valving system for shutting off liquid flow from a source of liquid under pressure, through an inlet, and into a tank upon the level of liquid within the tank rising above a predetermined level.

A further object is to provide such a valving system having a valving mechanism which "fails open," and which is normally open when in communication with the source of liquid under pressure, whereby liquid flow into the tank is permitted absent a positive command signal indicative that the liquid within the tank is above a predetermined level.

Yet another object is to provide such a valving system which is of the fluidic type, having a level sensing device having no moving parts, whereby the reliability and maintenance problems inherent in non-fluidic systems, such as those employing a movable float member for actuating a shutoff valve, are avoided.

A still further object is to provide such a fluidly actuated valving system which is actuated by the pressure of the liquid conducted to the tank and which thus does not require an additional source of fluid under pressure for actuation of its valving mechanism.

Still another object is to provide a valving system providing the above-stated advantages which is nevertheless of relatively inexpensive and practicable manufacture, having no requirement for electrical sensing or actuating devices.

Another object is to provide such a valving system which is operable gradually to shut off liquid flow into a tank as the level of liquid within the tank approaches a predetermined level, whereby sharp pressure differentials caused by sudden closures of valving elements are avoided.

Yet another object is to provide such a valving system which is adapted to be conveniently installed in cooperation with existing fuel tanks and the like for preventing overfilling thereof, the valving system having a level sensor which may be easily positioned at any desired level within a tank.

Another, major object is to provide such a valving system having the high standards of reliability and durability which are required for aircraft applications.

Other objects and advantages will be apparent from the specification and claims and from the accompanying drawing illustrative of the invention.

Figure 1:
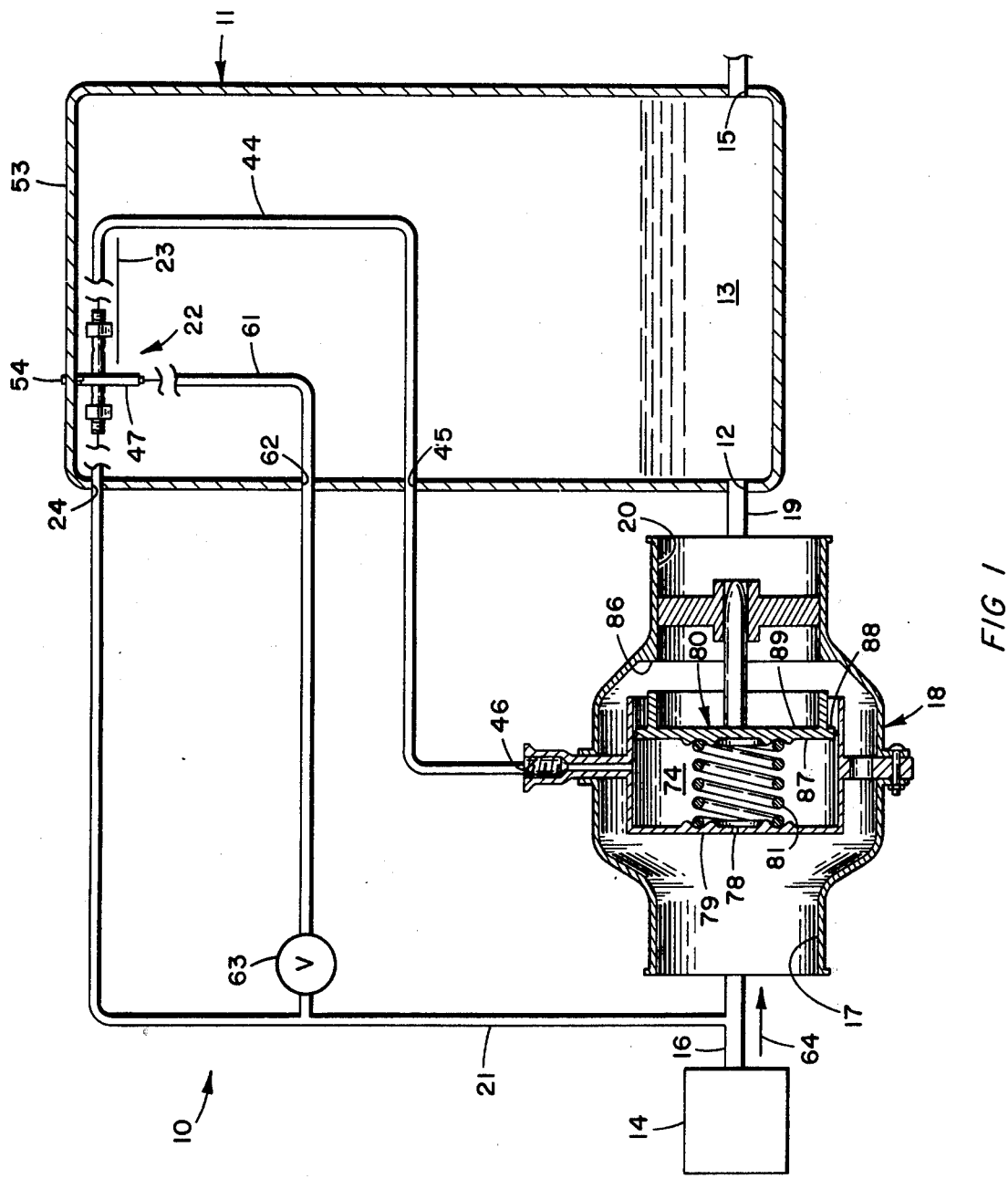
FIG. 1 is a partially diagrammatic, partially sectional representation of a valving system constructed according to one embodiment of the present embodiment and showing a fuel tank in which the system is installed.

Referring initially to FIG. 1, a valving system 10 constructed according to a preferred embodiment of the invention is associated with a tank 11 having an inlet 12 for receiving a liquid 13 from a source 14 of liquid under pressure, i.e., under a pressure greater than that of the environment in which the system 10 is to be used. In the present, illustrative embodiment, the tank 11 is a fuel tank and the liquid 13 is a liquid, aircraft fuel such as "JP-5," which is a kerosene based, hydrocarbon fuel. An outlet 15 is provided for permitting the fuel 13 to be conducted from the tank 11 for use in an engine, such as the engine of a jet aircraft (not shown). The source of liquid under pressure 14 may thus comprise a fuel truck having a pump for supplying the fuel to the tank 13, or an airborne tanker aircraft having a reservoir of fuel under pressure greater than atmospheric pressure.

A first pipe or conduit 16 is connected between the source of liquid under pressure 14 and the inlet 17 of a pressure responsive shutoff valve 18, to be described in greater detail hereinbelow. Additional, disconnectable couplings of appropriate design, not shown, are suitably connected in series between the source of liquid under pressure 14 and the shutoff valve 18. The valve 18 has an outlet 20 which is connected to a second conduit 19, the second conduit communicating between the valve outlet 20 and the inlet 12 of the tank 11. A third conduit 21 is provided in communication between the source of liquid under pressure 14 (and the inlet 17 of the valve 18) and a fluid sensor 22 mounted within the tank 11 at a predetermined level 23 above which the liquid 13 is desired not to rise. The third conduit 21 is suitably connected in communication with the first conduit 16, and is suitably extended within the tank through a corresponding opening 24.

Figure 2:
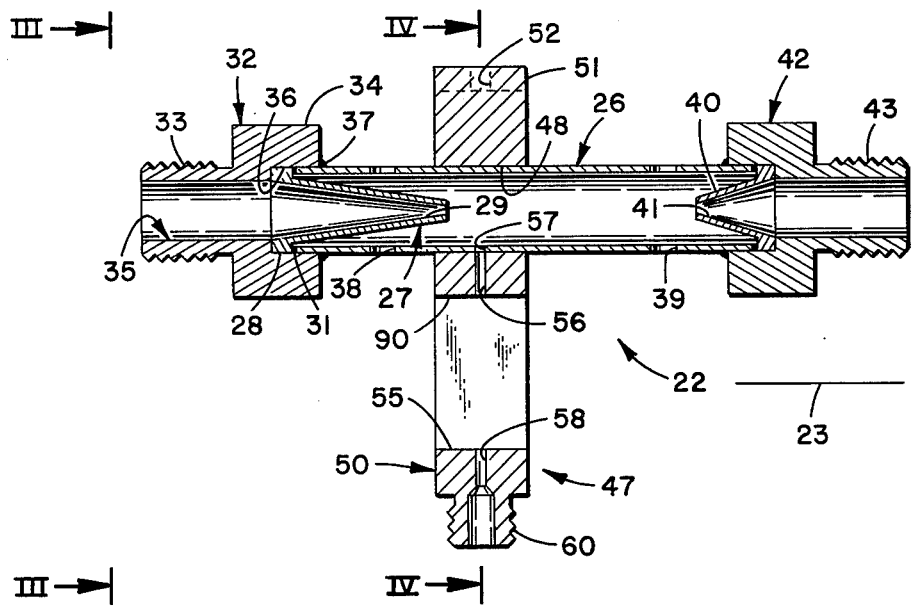
FIG. 2 is a longitudinal sectional view, on an enlarged scale, of the fluid sensor of the valving system of FIG. 1.

With additional reference now to FIG. 2, the fluid sensor 22, in the present embodiment, includes a generally tubular body 26. Mounted coaxially within one end of the tubular body 26 is a first nozzle 27 of frustoconical configuration, having an outwardly projecting flange 28 at its base and an outlet orifice 29 directed axially along the tubular body. The flange 28 has an outer diameter substantially equal to that of the tubular body 26, and the frustoconical body of the nozzle 27 is adapted to extend within the adjacent, open end of the tubular body 26. The flange 28 is affixed to the end of the tubular body suitably by a weldment 31, for providing sealing association therebetween. The nozzle 27 is also fixedly constrained, in the present embodiment, by means such as a coupling 32 affixed to the tubular body 26. The coupling 32 suitably has a stem portion 33, a head portion 34 of hex configuration, and an internal bore 35 extending coaxially therethrough. The bore 35 has an enlarged portion 36 extending within the head portion 32 from its surface opposite the stem 33, the enlarged portion 36 being of a diameter slightly greater than the outer diameters of the tubular body 26 and the nozzle flange 28, the flange 28, weldment 31, and tubular body 26 being seated within the enlarged portion 36 of the bore 35. The coupling 32 is affixed to the tubular body 26 by welding, as indicated at 37, or by other suitable means. The diameter of the bore 35, in its non-enlarged portion, is substantially the same as that of the nozzle 27 at its base, whereby the inner surface of the nozzle 27 is substantially contiguous with the surface defining the bore 35, when the nozzle 27 is affixed within the head portion 34 of the coupling 32. The coupling stem portion 33 is externally threaded for receiving a corresponding fitting, not shown, on the third conduit 21 (FIG. 1), whereby communication is provided between the first conduit 16 and the first nozzle 27.

The tubular body 26 is provided with a plurality of first drain openings 38 angularly spaced around the first nozzle 27, and a plurality of second drain openings 39 similarly spaced and positioned adjacent the opposite end of the tubular body.

At the end of the tubular body 26 opposite the first nozzle 27 is a second nozzle 40 having an orifice 41 and which, in the present embodiment, is of a construction similar to that of the first nozzle except that its frustoconical nozzle portion is shorter and thus less acute than that of the first nozzle 27. The second nozzle 40 is directioned coaxially within the tubular body 26 and toward the first nozzle 27 and is affixed in place by a second coupling 42 similar to the first coupling 32. The second coupling 42 has an externally threaded stem portion 42 similar to that of the first coupling 32, for facilitating connection of the coupling 42 with a fourth conduit 44 (FIG. 1) which suitably extends through a second opening 45 formed through the tank 11, the fourth conduit 44 communicating with a port 46 in the shutoff valve 18.

Figures 3, 4:
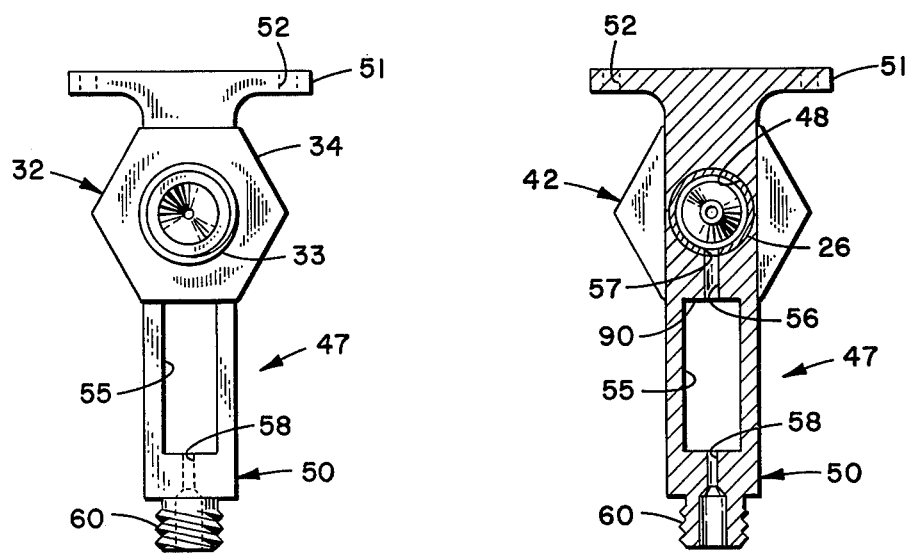
FIG. 3 is an end view of the fluid sensor of FIG. 1 taken as on line III—III of FIG. 2.
FIG. 4 is a cross-sectional view of the fluid sensor of FIG. 1 taken as on line IV—IV of FIG. 2.

The sensor 22 further includes, in the present embodiment, a frame member 47 in which the tubular member 26 is mounted. Referring to FIG. 4, the tubular member 26 extends through and is tightly fitted within a corresponding bore 48 formed through the frame member 47. In vertical section, as viewed in FIG. 4, the frame member 47 is generally T-shaped, having an elongated body portion 50 through which the bore 48 is formed, and having oppositely directioned, upper flange portions 51 extending perpendicularly of the body portion in T-head configuration. The flange portions 51 are suitably provided with respective bores 52 formed vertically therethrough for facilitating mounting of the sensor 22. As shown in FIG. 1, the sensor 22 is suitably fastened to and beneath an upper wall 53 of the tank 11 by means of suitable fasteners 54 extending through the top wall 53 and through the bore 52 (FIG. 4). In the present embodiment, the body portion 50 extends substantially vertically downwardly from the flange portions 51, and the tubular body 26 extends substantially horizontally.

Referring to FIGS. 2–4, the frame member body portion 50 has formed centrally therethrough a rectangular opening or slot 55 which extends vertically along a portion of the body portion 50 below the tubular body 26. A bore 56 is formed vertically between the slot 55 and the horizontal bore 48 in which the tubular body 26 is mounted, and a corresponding port or opening is formed through the adjacent portion of the tubular body 26, the tubular body being positioned with its opening 57 in alignment with the vertical bore 56 of the frame member 47, whereby fluid communication is permitted through the bore 56 and the opening 57 with the interior of the tubular body 26 along an axis which intersects the common axis of the orifices 29, 41 of the first and second nozzles 27, 40. Another orifice, termed hereinafter the ejection orifice 58, communicates with the slot 55 and extends downwardly therefrom through the lower end of the frame body 50, the ejection orifice 58 being aligned coaxially with the upper bore 56 and the opening 57. The ejection orifice 58 may also be defined as the "third nozzle 58," the term "nozzle," as used herein in reference to the nozzle 27 and the nozzle or orifice 58, having the meaning merely of a short tube or duct capable of ejecting an axial jet, rather than denoting a particular outward configuration. The ejection orifice 58 is necessarily spaced below the predetermined level 23, for reasons which will become apparent from the description to follow. The ejection orifice 58 communicates through a downwardly extending sleeve portion 60 of the frame body 50, the sleeve portion 60 being externally threaded for facilitating its connection with a suitable coupling, not shown, for providing communication with a fifth conduit 61 (FIG. 1) which extends through a third opening 62 formed through the tank 11. The fifth conduit 61 communicates with the first conduit 16 upstream of the shutoff valve 18, suitably by communication through the third conduit 21, as shown in FIG. 1.

A normally open, suitably manually operated shutoff valve 63 is fluidly connected in series with the fifth conduit 61 and between the ejection orifice 58, (FIGS. 2–4) of the sensor 22 and the third conduit 21 (FIG. 1). The manual shutoff valve 62 is suitably a normally open, two-way, two-position, manually operated, spring return valve, but may instead be of the remotely actuated, electrically energized type if remote operation thereof is required.

Suitable gaskets or seals, not shown, are mounted within the openings 24, 45, and 62 and sealingly associated with the third, fourth, and fifth conduits 21, 44, and 61, respectively, and suitable seals are provided between the sensor 22 and the upper wall 53 of the tank 11.

Figure 5:
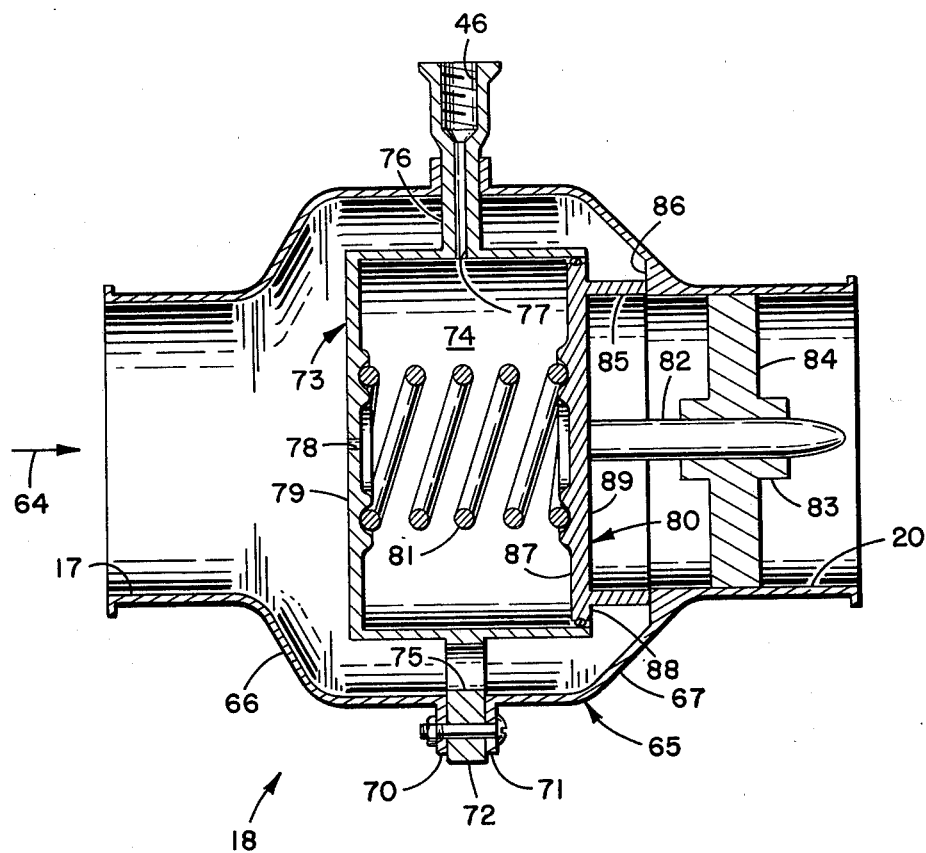
FIG. 5 is a longitudinal sectional view of the shutoff valve of FIG. 1 and showing the valve closure member in its closed position.

With reference now to FIG. 5, the pressure sensitive shutoff valve 18 is shown in somewhat greater detail and in its closed condition. The valve 18 is of a type known in the art, operable to permit fluid flow between its inlet 17 and its outlet 20 so long as the fluid pressure received through its port 46 remains below a given level relative to the pressure of the liquid received at its inlet 17. The normal directon of liquid flow is indicated by the arrow 64. An example of a similar valve which is suitable for the present embodiment is one which is available from the Parker-Hannifin Corporation as model no. 2700 133M 3. Inasmuch as the valve 18 is similar to valves which are commercially available, its construction will not be described in great detail herein except insofar as is necessary for an understanding of its operation in cooperation with the other portions of the system 10.

The shutoff valve 18 includes an axisymmetric, outer housing structure 65 communicating between the inlet 17 and the outlet 20, the housing structure 65 being of annular cross-sectional configuration and of an enlarged inner diameter relative to the inlet 17 and the outlet 20, which extend coaxially from the housing structure in opposite directions. The housing structure 65 is centrally divided, along a plane transverse of its axis, into first and second, approximately symmetrical housing segments 66, 67 which respectively communicate with the inlet 17 and the outlet 20. The housing segments 66, 67 have, extending along their adjacent portions, radially projecting, annular flanges 70, 71, the flanges having substantially planar, centrally facing surfaces between which is mounted an annular frame member 72 which extends transversely of the valve housing 65. The frame 72 serves to support a cup member 73 which extends coaxially through the frame and defines a piston chamber 74 open toward the valve outlet 20. The annular frame 72 has a plurality of angularly spaced ports or openings 75 formed therethrough, spaced radially between the flanges 70, 71 and the cup member 73, for permitting liquid flow therethrough between the valve inlet 17 and outlet 20 and around the cup member 73, the openings 75 being separated by several radially extending struts 76 which support the cup member 73. The valve port 46 communicates, through a passageway 77 formed through one of the radial struts 76, with the piston chamber 74, and the cup member 73 has an orifice 78 formed coaxially therethrough, through a flat end wall 79 of the cup member 73, and communicating between the valve inlet 17 and the piston chamber 74.

A piston 80 is slideably and sealingly mounted within the cup member 73 for reciprocal movement therein, and a coiled spring 81 is coaxially mounted within the piston chamber 74, footed under compression between the cup member end wall 70 and the piston 80, for urging the piston 80 in the direction toward the valve outlet 20. An axial guide rod 82 is affixed to the piston 80 on its side facing the outlet 20 and extends coaxially from the piston and within the outlet 20. A corresponding guide member 83 is mounted within the outlet 20 for slidingly receiving the guide rod 82 and preventing non-axial movement thereof, the guide member 83 being centrally mounted within the valve outlet 20 by struts 84 extending radially therefrom. An annular valve closure member 85 is coaxially affixed to the piston 80 on its side facing the outlet 20, the closure member 85 being in the form of a sleeve extending coaxially from the piston 80 toward the outlet 20, a corresponding, annular valve seat 86 being formed on the housing structure second segment 68 circumferentially of the outlet 20 for receiving the valve closure member 85. The closure member 85 is maintained in sealing contact with the valve seat 86, when the valve 18 is in its closed condition (FIG. 5), by the biasing action of the spring 81. The surface area of the piston structure 80 facing the spring defines a first piston face 87, and the surface area facing in the opposite direction and extending radially outwardly from the valve closure member 85 defines a second piston face area 88 extending circumferentially of the closure member 85.

In operation, and before any fuel is supplied to the system 10, the spring 81 maintains the valve closure member 85 in sealing contact with the valve seat 86 so long as no substantial liquid pressure is received at the valve inlet 17. Upon liquid under pressure being received in the inlet 17, however, liquid pressure is applied to the second piston face area 88, overcoming the biasing action of the spring 81 so long as no substantial fluid pressure (pressure above a predetermined level relative to the pressure of liquid received through the inlet 17) is present within the piston chamber 74 which, together with the force exerted by the spring 81 against the piston 80, exceeds the oppositely directioned force exerted against the second piston face area 88. The liquid fuel also enters the piston chamber 74 through the orifice 78 and, upon the piston chamber 74 being filled with fuel, flows therefrom through the passageway 77, (FIG. 5) and the port 46. Referring primarily to FIG. 1, the fluid then flows through the fourth conduit 44 to the fluid sensor 22, where it flows through the orifice 41 (FIG. 2) of the second nozzle 40 (FIG. 2) and then drains through the drain openings 38, 39 (FIG. 2) into the tank 11 (FIG. 1). Because the valve chamber 74 thus communicates with an open outlet (i.e. the drain openings 38, 39), the pressure within the chamber 74 remains below that outside the chamber 74 so long as liquid is permitted to flow freely from the chamber 74 through the port 46, the conduit 44, and the drain openings of the sensor 22. Accordingly, the valve 18 normally remains in its open position (FIG. 1) upon liquid under pressure being received at the inlet 17. So long as the valve 18 remains in its open condition, liquid under pressure from the source of liquid under pressure 14 also exerts a force against the central portion 89 of the surface of the piston extending within the valve closure member 85 and facing the outlet 20 (termed hereinafter the third piston face area 89) whereby the valve 18 tends to remain in its open position. Because of the frictional resistance to flow through the orifice 78, movements of the piston 80 are damped, and closure or opening of the valve 18 as a result of spurious, transient pressure differentials across the piston 80 is prevented.

Referring to FIG. 1, assume that the source of liquid under pressure 14 is a source of liquid fuel and that the tank 11 is a substantially empty fuel tank aboard a vehicle such as a jet aircraft, not shown. (As previously suggested, additional coupling means may be employed between the liquid source 14 and the pressure sensitive shutoff valve 18 in accordance with the requirements of particular applications of the system 10.) As fuel is introduced to the system 10 through the first conduit 16, the piston structure, comprising the piston 80 and the valve closure member 85, are displaced inwardly within the piston chamber 74, as shown in FIG. 1, by fluid pressure acting against the second piston face area 88, whereupon the fuel may flow around the cup member 73, between the valve seat 86 and the valve closure member 85, through the valve outlet 20 and the second conduit 19, and into the tank 11. Fuel is also conducted into the piston chamber 74 through the orifice 78, and from thence flows through the fourth conduit 44 to the fluid sensor 22, from which it drains into the tank 11.

Fuel is also conducted from the first conduit 16 and through the third conduit 21 to the fluid sensor 22, and from the third conduit 21 through the normally open, manual shutoff valve 63 and the fifth conduit 61 to the fluid sensor 22.

With additional reference now to FIG. 2 and continued reference to FIG. 1, the liquid fuel conducted to the sensor 22 through the third conduit 21 is received within the first nozzle 27 and ejected therefrom through the tubular body 26 in a generally horizontal liquid jet directioned toward the orifice 41 of the second nozzle 40. The first nozzle 27, together with the third conduit 21 in communication with the source of liquid under pressure 14, thus comprises a means for ejecting a first jet of fluid within the tank 11 and above the predetermined level 23.

In addition, fuel conducted to the sensor 22 through the fifth conduit 61 is ejected upwardly through the ejection orifice 58, forming a second jet of fluid which is directed through the vertical bore 56 and the opening 57 into the tubular member 26 and toward the first, substantially horizontal jet of fluid ejected from the first nozzle 27. The ejection orifice 58, with the fifth conduit 61 and the third conduit 21 providing communication with the source of fluid under pressure 14, thus comprises a means for ejecting upwardly a second jet of fluid, from a location within the tank which is below the predetermined level 23, toward the first jet of fluid ejected from the first nozzle 27. It is to be understood that while the particular embodiment thus far described and illustrated is preferred, in other embodiments, now shown, the means for ejecting first and second jets of fluid do not necessarily entail fluid communication with the source of liquid under pressure 14 which is connected to the inlet of the pressure responsive shutoff valve 18. Thus, the invention also encompasses the use of sources of liquid or gas under pressure, in addition to the source 14, for supplying a liquid or gas under pressure to the first nozzle 27 and the ejection orifice 58, or to either one of the nozzle 27 and the orifice 58.

Referring again to FIGS. 1 and 2, the second, or upwardly directioned jet of fluid, which is ejected from the orifice 58, thus intersects the first, or substantially horizontally directioned jet of fluid within the tubular body 26 and deflects and breaks up the horizontal jet within the tubular body 26, thus preventing the horizontal jet from impinging upon the orifice 41 of the second nozzle 40. The fluid ejected into the tubular body 26 at this stage drains from the tubular body 26 through the drain openings 38, 39.

Upon the level of the liquid fuel 13 rising above the ejection orifice 58, however, the upwardly directioned jet ejected from the orifice 58 begins to dissipate within the liquid 13 and, more specifically, begins to diverge, forming a spray of conical dispersion pattern, rather than an axial jet. Because the diverged spray exerts a much smaller force per unit area upon a target than does an axial jet (because its momentum per unit area is less), the total force exerted against the horizontal jet ejected from the first nozzle 27 is greatly reduced. As the level of the fuel rises to the predetermined level 23, the divergence of the spray ejected upwardly from the ejection orifice 58 increases to a level at which its momentum per unit area is substantially reduced and at which no substantial deflection of the horizontal jet from the first nozzle 27 occurs, whereupon the first jet impinges against the second nozzle 40 and partially enters the orifice 41 of the second nozzle, preventing drainage of fuel from the second nozzle 40 and causing a substantial increase in the pressure within the fourth conduit 44, the port 46 of the shutoff valve 18, and the piston chamber 74 of the valve 18. The increased fluid pressure within piston chamber 74 acting against the first piston face area 87, in addition to the biasing force of the spring 81, urges the piston 80 outwardly and causes the valve closure member 85 to be moved into sealing association with the valve seat 86, shutting off the flow of fuel through the valve 18 and into the tank 11. Upon the level of fuel in the tank 11 falling below the predetermined level 23, the jet ejected upwardly from the orifice 58 again is permitted to deflect and break up the horizontal jet ejected from the first nozzle 27, lowering the pressure head within the second nozzle 40 and the fourth conduit 44, and again permitting the pressure sensitive shutoff valve 18 to open.

Upon the pressure responsive shutoff valve 18 being closed, a small, residual liquid flow continues into the tank 11 through the first nozzle 27 and the ejection orifice 58, and it will thus be necessary to disconnect the fuel supply 14 from the first conduit 16 (or shut off the liquid flow through the third conduit 21 by another shutoff valve, not shown) if it is desired that no aadditional fuel be permitted to enter the tank 11.

The embodiment of the sensor 22 shown in FIGS. 2–4 is preferred because of its high sensitivity to variations in the upwardly directioned jet caused by the level of fuel in the tank 11 rising to the predetermined level 23. The downwardly facing surface 90 of the frame body portion 50 which surface 90 defines the upper boundary of the rectangular slot 55, together with the tubular body 26, serves as a mask which permits passage, through the bore 56 and opening 57, only of a fairly narrow jet of fluid. Without the mask provided by the tubular body 26 and the surface 90, a large proportion of the upwardly directed jet from the ejection orifice 58 would impinge upon the horizontal jet even though the upwardly directed jet was dispersed into a non-axial, diverging spray by adjacent liquid in the tank 11, because the diverged spray would impinge against a substantial length of the horizontal jet ejected from the first nozzle 27. Accordingly, the mask provided by the surface 90 and the tubular body 26 provides a substantial increase in sensitivity to rises in liquid level above the ejection orifice 58, because the change in the momentum of the jet received through the bore 56 and the opening 57 as the vertical jet is dispersed by a rising fuel level above the orifice 58 is far greater than the change in the momentum exerted against an open, horizontal jet absent the mask provided by the tubular body and the upper portion of the body portion 50. (Such a condition occurs in the sensor structure 22A of FIGS. 6 and 7, to be described.) Additionally, the tubular body 26, defining an axial passageway 91 extending between the first nozzle 27 and the second nozzle 40, serves to shield the horizontal jet from interruptions which could be caused by splashing or peaks in the surface of the liquid 13, which would otherwise cause transient interference with the sensor 22 which might effect spurious closure of the pressure responsive shutoff valve 18.

An important advantage of the present system is that the operation of the sensor 22 to increase the pressure within the valve port 46 to close the valve 18 is a gradual operation rather than a sudden pressure change, in that the upwardly directed jet is slowly diverged as the liquid level approaches the predetermined level 23, and the horizontal jet is thus permitted to return slowly to its horizontal, axial mode. This results in a slow change in pressure differential across the piston 80 and a gradual closing of the pressure responsive shutoff valve 18, minimizing any transient, sharp pressure differentials across the valve 18 which might damage the fuel supply system, any fuel distribution system (19) downstream of the pressure responsive shutoff valve 18, or the valve 18 itself.

The manually operable shutoff valve 63 may be employed as a testing means for verifying the operability of the sensor 22 and the pressure responsive shutoff valve 18 before the fuel 13 rises to the predetermined level 23. Upon the manually operable shutoff valve 63 being closed, the jet ejected upwardly from the ejection orifice 58 (FIGS. 2–4) is shut off, permitting the jet ejected from the first nozzle 27 to impinge against the second nozzle 40 even though the fuel level in the tank 11 is below the sensor 22. This causes an increased pressure head within the second nozzle 40 and the fourth conduit 44, which effects closure of the pressure responsive shutoff valve 18. Thus, the manually operable shutoff valve 63 is advantageously momentarily closed whenever verification of the operability of the system is desired, and may be suitably employed as a pre-check or interruption valve whenever fuel is to be introduced into the tank 11.

The dimensions of the components of the sensor 22 vary in accordance with the particular liquid 13 and fluid pressures involved in the particular application. As an example, satisfactory results have been obtained, for supply pressures in the third conduit 21 of about 20–60 psi, with a first nozzle 27 having an outlet orifice 29 having a diameter of 0.15 inches. In one embodiment, for example, satisfactory results were obtained with a supply liquid of JP-5 kerosene based fuel at a supply pressure at the sensor 22 of 60 psi, with a first nozzle 27 having an orifice 29 of 0.15 inches in diameter, a second nozzle 40 spaced approximately 2 inches from the first nozzle and having an orifice 41 of 0.1 inches, an ejection orifice 58 having a diameter of 0.4 inches, an a mask surface 90 having a bore 56 and tube opening 57 each of about 0.06 inches diameter, the combined length of the bore 56 and tube opening 57 being about 0.75 inches. The tubular body 26 had an inner diameter of about 0.4 inches, with drainage orifices 38, 39 of about 0.10 inches diameter, and the opening 57 was aligned with the common axis of the two nozzles 27, 40 at a location thereon spaced about 0.25 inches from the tip of the first nozzle 27. The ejection orifice 58 was spaced by about 0.75 inches from the mask 90. Using this configuration, it was found that operation of the particular shutoff valve 18 to shut off inflowing fuel was effected when the level of fuel reached a point approximately 0.5 inches above the ejection orifice 58, so that the sensor 22 was thus mounted in the tank 11 with its ejection orifice spaced that distance below the predetermined level 23. In applying the system to a particular application, the positioning of the sensor 22 is advantageously determined by empirical testing, observing the reaction of the shutoff valve 18 as the liquid 13 rises above the ejection orifice 58. The above-described sensor is, of course, merely an example, and various changes in its construction may be employed within the scope of the appended claims. As an example, the sensor 22 may be mounted at a lower position within the tank 11 if it is desired that the inflowing fuel be shut off at a lower level.

If enhanced reliability of the sensor 22 is desired, it may be desired to employ dual (or multiple) ejection orifices 58, not shown, spaced apart angularly or, alternatively, longitudinally along a locus extending below the tubular body 26, for ensuring operability in the event one of the ejection orifices becomes obstructed.

Figure 6:
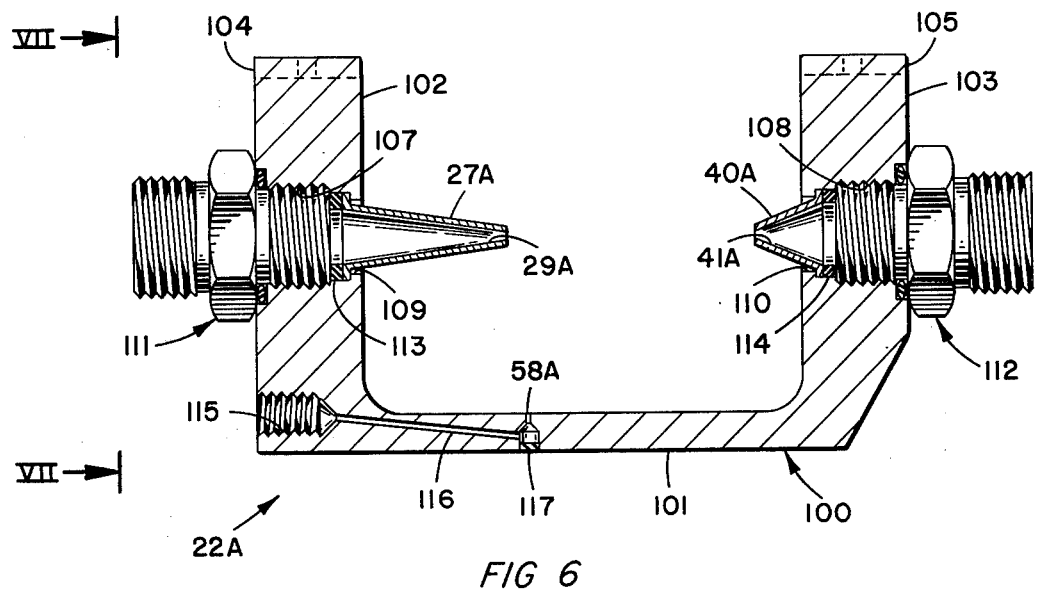
FIG. 6 is a longitudinal sectional view, similar to FIG. 2, of a modification of the fluid sensor of FIGS. 2–4.
Figure 7:
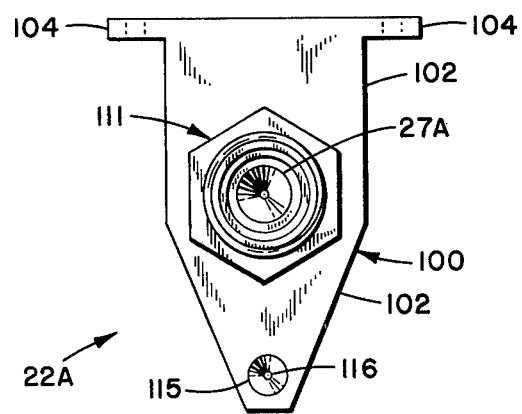
FIG. 7 is an end view of the fluid sensor of FIG. 6 taken as on line VII—VII.

While the structure of FIGS. 1–5 is an example of a preferred embodiment, a further modification thereof which may have utility for less critical applications is shown in FIGS. 6 and 7. A generally U-shaped frame 100 is provided having an elongated body portion 101 which extends generally horizontally, in use, and first and second legs 102, 103 extending upwardly from opposite end portions of the body portion 101. Atop the first and second legs 102, 103 are suitably provided outwardly extending flanges 104, 105 for facilitating mounting of the sensor 22A in a container of liquid such as the fuel tank 11 of FIG. 1. First and second fluid nozzles 27A and 40A, of configurations respectively similar to those of the first and second nozzles 27 and 40 of the structure of FIGS. 2–4, are seated within mutually aligned bores 107, 108 formed respectively through the first and second upright legs 102, 103 of the frame structure 100, and the nozzles 27A, 40A are positioned in mutually confronting, coaxial alignment, with their respective orifices 29A, 41A in coaxial alignment, as in the sensor 22 of FIGS. 2–4. The first and second nozzles 27A, 40A are adapted to seat against radially inwardly projecting, annular lips 109, 110 formed coaxially of the bores 107, 108 adjacent the centrally facing surfaces of the upright legs 102, 103, respectively. The nozzles 27A, 40A are constrained in mutual alignment by any suitable means, and may be conveniently and removably positioned by first and second reducing unions 111, 112 which are respectively threaded within the bores 107, 108 from the outwardly facing sides of the first and second upright legs 102, 103, respectively, suitable annular seals 113, 114 being seated respectively between the first nozzle 27A and the first union 111 and between the second nozzle 40A and the second union 112.

An ejection orifice 58A, corresponding to the ejection orifice 58 of FIGS. 2–4, is formed vertically through the elongated body portion 101 in alignment with and between the first and second nozzles 27A and 40A. In use, communication is provided between the ejection orifice 58A and the fifth conduit 61 by a suitable fitting, not shown, and suitably by a threaded bore 115 adapted to receive such a fitting. Communication is provided between the threaded bore 115 and the ejection orifice 58A through an approximately horizontal passageway 116. For manufacturing convenience, the ejection orifice 58A is suitably formed entirely through the elongated body portion 101 from its lower side, and a plug 117 is then welded or otherwise affixed in the lower end of the orifice 58A below its intersection with the passageway 116.

In use, the sensor 22A is mounted in a liquid container, such as the tank 11, adjacent the predetermined level 23 above which the liquid is desired not to rise, with its ejection orifice 58A positioned below the predetermined level. The third conduit 21 (FIG. 1) is connected to the first union 111 in communication with the first nozzle 27A, whereby a predominately horizontal jet of the liquid is ejected through the first nozzle 27A toward the second nozzle 40A, as in the sensor structure 22 of FIGS. 2–4. The fifth conduit 61 (FIG. 1) is connected in communication, through the passageway 116, with the ejection orifice 58A, and thus conducts liquid under pressure to the ejection orifice 58A to cause the ejection therethrough of an upwardly directed jet of liquid which normally diverts and breaks up the horizontal jet ejected by the first nozzle 27A, as in the structure of FIGS. 1–5. The sensor 22A operates to effect closing or opening of the pressure responsive shutoff valve 18 (FIG. 1) as the fuel level rises or falls in the same manner as has been described previously with respect to the structure of FIGS. 1–5. The sensitivity of the sensor 22A of FIGS. 6 and 7 can also be enhanced by the addition of a tubular body, not shown, corresponding to the tubular body 26 of FIGS. 2–4 and which extends from the first upright leg 102, around the first nozzle 27A, and toward the second nozzle 40A to a location spaced between the second nozzle 40A and the ejection orifice 58A, the tubular body being provided with a lower opening in alignment with the ejection orifice 58A, as in the sensor structure 22 of FIGS. 2–4, for enhancing the sensitivity of the sensor 22A.

It can now be understood that the system 10, employing either the sensor 22 of FIGS. 1–4 or the sensor 22A of FIGS. 6 and 7, provides an improved valving system for shutting off liquid flow, from a source of liquid under pressure, and through an inlet into a tank, upon the level of liquid within the tank rising above a predetermined level. The level sensor is of the fluidly actuated type having no moving parts, whereby the reliability of the system is greater than those systems employing movable float members and the like. As has been discussed, the pressure sensitive shutoff valve 18 is of a fail open type, whereby liquid flow into the tank 11 is permitted through the valve 18 even in the event the sensor 22 malfunctions in such a manner that no pressure increase is received at the port 46 of the pressure responsive shutoff valve 18. Such a condition would exist, for example, if either the first or second nozzles of the sensor were obstructed, or if either the third or fourth conduits 21, 44 became obstructed or ruptured. It should be further noted that the system 10 is actuated solely by the fluid pressure derived from the source of liquid under pressure 14 rather than by an additional, independent source of pressure as is the case in certain of the prior-art systems, whereby the present system 10 eliminates possible disadvantages of such systems relating to the cost, weight, and complexity entailed in employing such independent pressure sources. In fact, while providing the important advantages of reliable operation, rugged construction, and fail-open valving, the present system is nevertheless of relatively inexpensive and practicable manufacture. Finally, as has been previously explained, the system is operable to close the pressure responsive shutoff valve 18 slowly, as the fuel 13 rises to the predetermined level, whereby undesirable transients are avoided, and no independent damping systems are required to protect the fluid supply or distribution systems.

While only one embodiment of the invention, together with modifications thereof, has been described in detail herein and shown in the accompanying drawing, it will be evident that various further modifications are possible in the arrangement of its components without departing from the scope of the invention.

What is claimed is:

1. A valving system for permitting substantial liquid flow into a tank upon the level of liquid within the tank being below a predetermined level and for preventing any substantial liquid flow into the tank upon the level of liquid within the tank being above the predetermined level, the valving system comprising:
    a liquid sensor comprising first, second, and third fluid nozzles and means immovably supporting the nozzles within the tank, the first and second nozzles being substantially coaxially aligned, positioned above the predetermined level, and directioned toward each other, the third nozzle being positioned below the predetermined level, between the first and second nozzles, and directioned toward the common axis of the first and second nozzles;

a unidirectional valve having an inlet, an outlet, and a port, the valve comprising a means normally permitting liquid flow between the inlet and outlet and, alternatively, for preventing liquid flow upon the valve port receiving liquid under a pressure above a predetermined level relative to the pressure or liquid received through the inlet;

a first conduit having a first end connected to the valve inlet and a second end connectable to a source of liquid under pressure;

a second conduit communicating between the valve outlet and the interior of the tank;

a third conduit providing communication between the first nozzle of the liquid sensor and the first conduit and valve inlet and comprising a means for conducting liquid under pressure from the first conduit to the first nozzle to cause a jet of liquid to be ejected from the first nozzle toward the second nozzle with sufficient force to impinge upon the second nozzle;

a fourth conduit communicating between the second nozzle and the valve port and comprising a means for conducting liquid under pressure from the second nozzle to the valve port upon liquid under pressure being received by the second nozzle from the first nozzle, the valve comprising a means preventing liquid flow from its inlet to its outlet upon liquid pressure being received through the fourth conduit upon fluid ejected from the first nozzle being received by the second nozzle; and a fifth conduit communicating between the third conduit and the third nozzle, the third nozzle comprising a means for ejecting liquid received from the fifth conduit toward the jet of liquid ejected from the first nozzle for diverting the jet from the second nozzle upon the third nozzle being above the level of liquid within the tank, whereby the valve remains open and, alternatively upon the level of liquid within the tank rising to the predetermined level, for dissipating liquid received from the fifth conduit, whereby the liquid jet ejected from the first nozzle is permitted to impinge upon the second nozzle for effecting operation of the valve to prevent liquid flow from its inlet to its outlet.

2. For a tank adapted to receive a liquid from a source of liquid under pressure, a valving system for preventing any substantial liquid flow into the tank upon the level of liquid within the tank being above a predetermined level, the valving system comprising:

means for ejecting a first jet of fluid within the tank at a location above the predetermined level;

fluid receiving means, within the tank, for receiving the first jet of fluid at a location above the predetermined level;

means for ejecting a second jet of fluid upwardly, from a location within the tank which is below the predetermined level when the level of the liquid is below the predetermined level toward the first jet of fluid for diverting the first jet of fluid from the fluid receiving means upon the level of liquid within the tank being below the predetermined level and, alternatively upon the level of liquid within the tank being above the predetermined level, for dissipating the second jet of fluid within the liquid whereby the first jet of fluid impinge against the fluid receiving means; and valving means for normally providing communication between the source of liquid under pressure and the interior of the tank and, alternatively, for preventing liquid flow into the tank through the valving means upon the first jet of fluid being received by the fluid receiving means.

3. The apparatus of claim 2, wherein the means for ejecting a second jet of fluid is a means for ejecting a jet of fluid upwardly along a substantially vertical axis.

4. The apparatus of claim 2, wherein the means for ejecting the first jet of fluid is a means for ejecting a jet of fluid along a substantially horizontal axis, and wherein the means for ejecting a second jet of fluid is a means for ejecting a jet of fluid along a substantially vertical axis.

5. The apparatus of claim 2, wherein the means for ejecting a first jet of fluid comprises a means, having communication with the source of liquid under pressure, for ejecting a jet of the liquid.

6. The apparatus of claim 2, the valving means having fluid communication with the fluid receiving means and comprising a pressure responsive valving means for preventing liquid flow through the valving means to the tank upon fluid pressure above a predetermined level being received from the fluid receiving means in response to reception by the fluid receiving means of the first jet of fluid.

7. The apparatus of claim 2, further comprising a structure defining an axial passage extending therethrough, the structure having an opening communicating with the passageway, means being provided for mounting the structure adjacent the means for ejecting a first jet of fluid and with the axial passageway in alignment between the means for ejecting a first jet of fluid and the fluid receiving means for permitting passage of the first jet of fluid through the axial passageway, the means for ejecting a second jet of fluid comprising a means for ejecting the second jet of fluid through the structure opening and into the axial passageway.

* * * * *